May 23, 1933.    A. L. MILLER ET AL    1,910,174
CONNECTING ROD GAUGE
Filed July 8, 1929    2 Sheets-Sheet 2
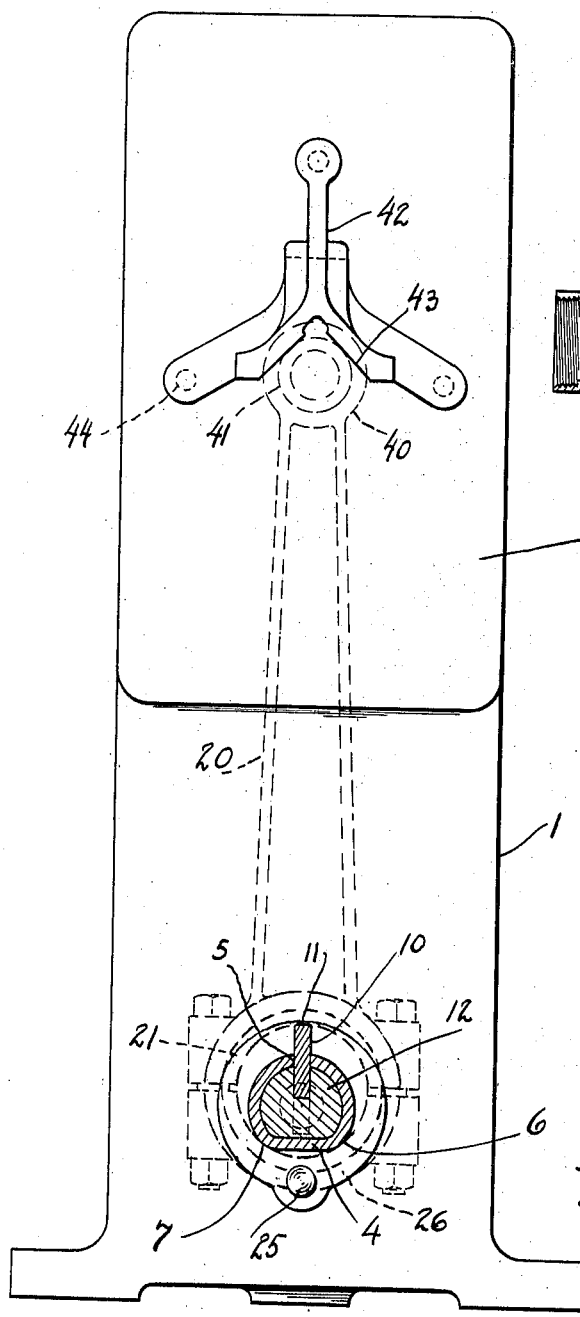
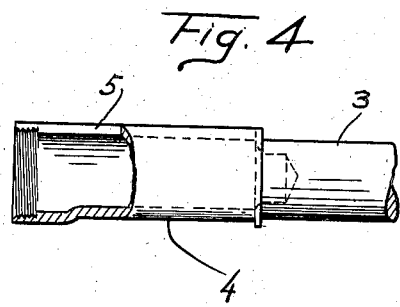
Fig. 4
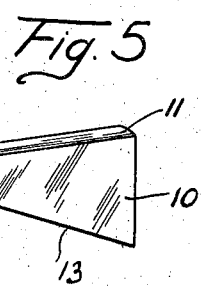
Fig. 5
Fig. 2
INVENTORS
Alvin L. Tiller and
Russell H. Tiller
BY
ATTORNEY.

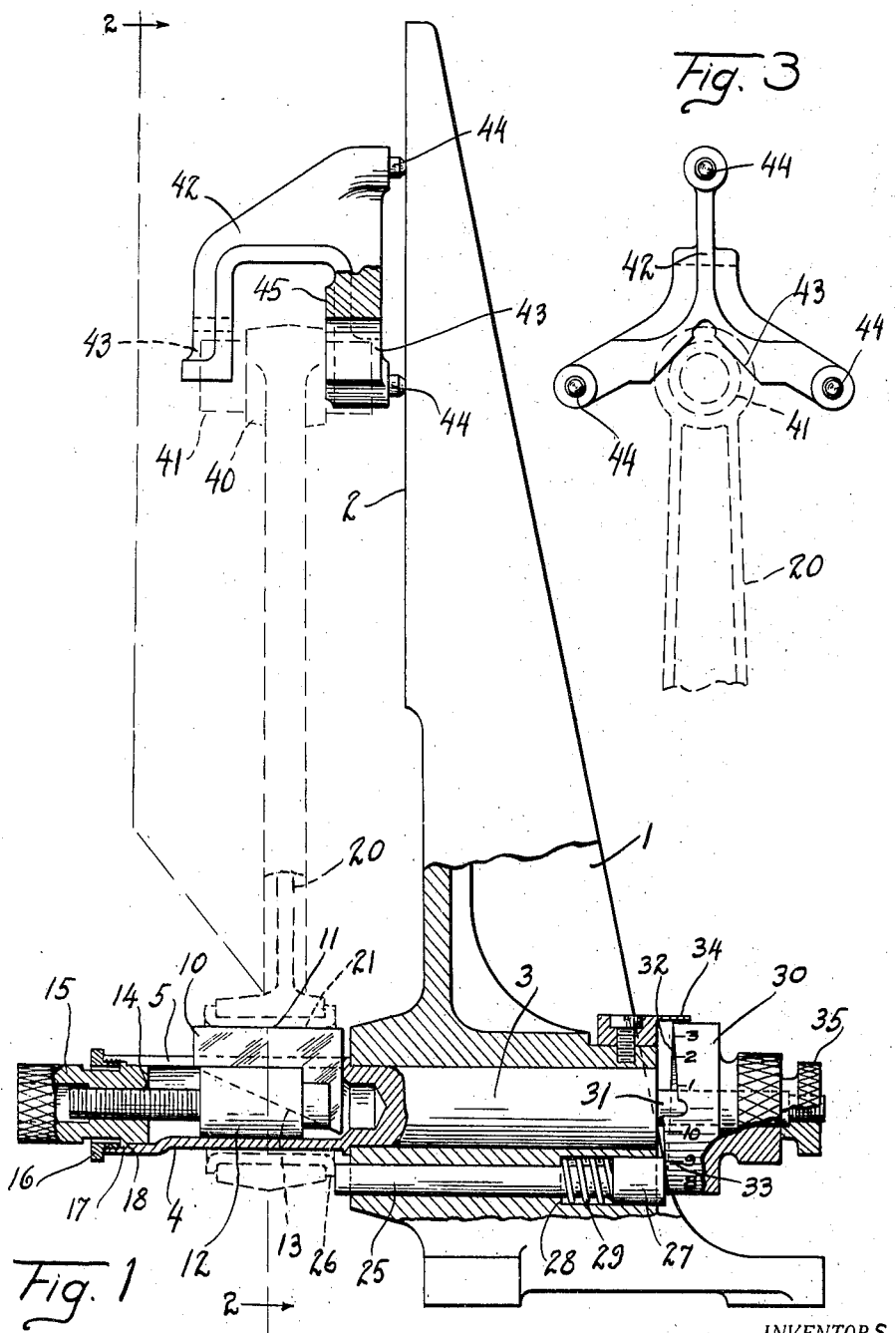

Patented May 23, 1933

1,910,174

UNITED STATES PATENT OFFICE

ALVIN L. MILLER AND RUSSELL H. MILLER, OF DETROIT, MICHIGAN

CONNECTING ROD GAUGE

Application filed July 8, 1929. Serial No. 376,634.

This invention relates to a device for gauging and aligning connecting rods, with special reference to a device useful in connection with connecting rods utilized in the engines of automotive vehicles.

Principal among the objects of the invention, is the provision of a device which is universal in character in that it can be used for connecting rods of many different engines involving different proportions. Broadly speaking, a connecting rod aligning device is not new, but the present invention involves certain improved features which make possible the aligning of numerous connecting rods having varying dimensions. The diameter of connecting rod bearings of various automobiles vary in size, as does also the length of this bearing, and the present invention contemplates an aligning device which has certain adjustable parts for accommodating connecting rods which vary in these respects. Also, the device embodies a controlling adjusting element equipped with suitable scale or other indicia, in order to permit of a pre-determined adjustment of the device for use with a known type of connecting rod.

In the accompanying drawings:

Fig. 1 is a view in illustration of the invention, showing the device with a connecting rod positioned thereon for gauging and aligning.

Fig. 2 is a view partly in section taken on line 2—2 of Fig. 1.

Fig. 3 is a view of the upper part of the device, looking from the opposite side thereof from Fig. 2.

Fig. 4 is a detailed view of one of the parts of the device.

Fig. 5 is a detail of a wedge element embodied in the adjustable construction.

The device comprises a body 1, in the nature of an upright and adapted to be placed upon, secured to, or otherwise associated with a suitable work bench, or the like, and the same has a plane gauging face 2. The lower portion of this body member is apertured for the reception of a stud 3, which is fixed to the body in a non-rotatable manner, as by means of being pressed into the aperture. One end of this stud member is hollow and enlarged, this end being referenced 4, and it also is provided with a slot 5.

The lower part of the portion 4 is flattened somewhat, as illustrated in Fig. 2, thus to provide two contact points 6 and 7, which two contact points, in conjunction with a third later to be described, effect a three-point contact with the bearing of a connecting rod. A wedge member 10 is disposed within the hollow portion 4 in such manner as to project through the slot, the same having a curved face 11 for contacting with the bearing. Also within the hollow portion is a block 12, which is slotted for the reception of the wedge, and the same has a slanting surface in the bottom of the slot so that the slanting surface of the wedge and the slanting surface in the slot abut against each other, as illustrated by the dotted lines at 13.

The block 12 has a screw-threaded extension 14, which engages an interiorly threaded nut 15, which is rotatable relative to the member 4, but which is held in fixed longitudinal position by nut 16 which is screw-threaded into the open end of the hollow part 4. The nut 15 has an annular shoulder 17, which is engaged between nut 16 and the shoulder 18 in the member 4.

A connecting rod is illustrated at 20, and in the use of the tool, a connecting rod bearing, illustrated at 21, is adapted to be placed over and supported by the stud 3. Various bearings of different sizes in diameter may be placed over the hollow part 4 of the stud, whereupon turning of the nut 15, which is preferably knurled for this purpose, moves the block 12 and projects the wedge 10 through the slot. The bearing is then engaged on its interior surface with sufficient tightness at three points 6, 7 and 11.

The connecting rod bearing 21 may not only vary in diameter, but in length, and to accommodate for this variation in length, there is a pin, or plunger 25 in the body of the device adjacent the stud 3, longitudinally adjustable relative to the body of the device against which the bearing member is adapted to abut at the point designated 26. This plunger has an enlarged head 27, and a coil spring is confined between the enlarged head and shoulder 28 in the body member in such manner as to normally urge the plunger toward the right, as viewed in Fig. 1. The spring is numbered 29.

On the end of the stud 3, opposite the hollow portion, there is mounted a rotatable adjusting element 30, and for this purpose, this end of the stud may have a reduced portion 31. This adjusting element has a cam face 32 which engages the end of the plunger, and it also has suitable scale or indicia, illustrated at 33, which is used in conjunction with a suitable pointer or the like 34 for adjusting purposes. The element 30 is fixed to the stud so that it can rotate with respect thereto, but is held against longitudinal movement thereon. A suitable nut 35 is adapted to be screwed tightly against the element 30 to hold the same in any desired adjustment.

It will therefore be seen that the turning of the cam element 30 causes longitudinal movement of the plunger 25 in such manner as to fix at a pre-determined point the place of contact between the end of the plunger and the face of the bearing, as illustrated at 26. The indicia on the cam element is preferably arranged in a pre-determined manner so that when a connecting rod of known dimensions is to be gauged and aligned, the cam element is first turned to proper position, which may be determined by aligning the requisite number on the cam element with the pointer 34, whereupon this adjustment may be maintained by the nut 35.

The wrist pin bearing of the connecting rod is shown at 40, and in the use of the device, a suitable pin 41 is placed to the bearing. These bearings may vary in size and a number of different sized pins are preferably kept at hand. A gauge device 42 is provided with inverted V bearings, as illustrated at 43. This gauge device is adapted to be seated upon the pin 41. The gauge device has a three-point contact with face 2 of the instrument, provided by suitable pins 44, and furthermore, the gauge device has a gauging face 45 accurately positioned and designed to contact with the face of the wrist pin bearing, after the manner illustrated in Fig. 1.

This gauge device, or aligning device as it is sometimes called, is designed for use in determining parallelism of the connecting rod bearing and the wrist pin bearing; it is designed to determine whether or not there is a twist in the connecting rod, and whether or not the center line of the connecting rod is true. When a true connecting rod is on the device, as is illustrated in Fig. 1, the shoulder of the connecting rod bearing 21 abuts against plunger 25; the face of the wrist pin bearing contacts with surface 45; the three points 44 on the gauge 42 contact with the face 2 on the body of the device. It will be noted that if the axial lines of the connecting rod bearing and the wrist pin bearing are out of parallelism, the upper point 44, or the two lower points 44, will not contact with face 2, and the connecting rod can be corrected until these axial lines are in parallelism. If the connecting rod is not true as to center line, the wrist pin bearing will not contact properly with face 45 so that corrections must be made. Also the connecting rod may be twisted, in which event, one of the lower points 44, or perhaps one of the lower and upper points 44 will not contact with face 2 so that corrections must be made to the connecting rod.

In the use of this tool, a connecting rod of known model or dimensions is taken, and through the use of a suitable chart or the like, the operator adjusts the cam element 30 in order to position the plunger 25 properly for the particular connecting rod to be gauged. In other words, the end of the plunger 25 is positioned so that when a proper contact is had at the point 26, the face 45 of gauge 42 properly contacts with the face of the wrist pin bearing. After the plunger 25 is positioned, the connecting rod bearing is placed over the stud 3, and the same is then tightened by the turning of the nut 15. It is now but necessary to seat the gauge device upon the pin 41, and note the imperfections, if any, in the connecting rod, which are shown by contact of the wrist pin bearing with the face 45, and by the three-point contact of the points 44 with the face 2; if there are any imperfections in the rod, the same is corrected as above pointed out, until it is true.

Accordingly, this one instrument is capable of use with many different sized and types of connecting rods in that the adjusting arrangement associated with the wedge 10 takes care of various diameters, while the adjustment associated with the plunger 25 takes care of varying bearing lengths. Preferably, a chart is applied directly to the body of this instrument indicating the proper set of the cam element 30 for known connecting rods of many various models of automobiles.

We claim:

1. A connecting rod gauging device comprising, a supporting member for supporting a connecting rod, a movable abutment against which a portion of the rod is adapted to abut, means for adjusting the abutment, and there being indicia associated with the adjusting means to indicate a predetermined adjustment of the abutment to accommodate for connecting rods of known and varying dimensions.

2. In a connecting rod gauging device for gauging connecting rods having a bearing at each end and in which the bearings vary as to their widths, means having a contacting surface against which the bearing at one end of the rod is adapted to contact, an adjustable abutment against which the bearing at the other end of the rod is adapted to abut, means for adjusting the abutment, and there being indicia associated with the adjusting means whereby a predetermined adjustment of the said abutment may be made to accommodate for connecting rods of known and varying dimensions.

3. A connecting rod gauging device comprising, a stud for supporting a connecting rod, a movable plunger which provides an abutment against which the rod engages, and a rotatable adjusting device having a cam action on said plunger for adjusting the same.

4. A connecting rod gauging device comprising, a stud for supporting a connecting rod, a spring-pressed plunger which forms an abutment for a portion of the connecting rod, and a rotatable adjusting member having a cam surface in contact with the plunger and acting in opposition to the spring for adjusting the abutment to proper position for a particular connecting rod.

5. A connecting rod gauging device comprising, a stud for supporting a connecting rod, a spring-pressed plunger which forms an abutment for a portion of the connecting rod, a rotatable adjusting member having a cam surface in contact with the plunger and acting in opposition to the spring for adjusting the abutment to proper position for a particular connecting rod, and there being indicia associated with the cam element for showing the adjustment of said plunger whereby the plunger may be adjusted in a pre-determined manner for a connecting rod of known dimensions.

6. A gauging device for connecting rods having a connecting rod bearing at one end and a wrist pin bearing at the other comprising, a body member having a gauging surface, an arbor supported by the body member positioned perpendicular with respect to the gauging surface, said arbor projecting beyond the body member and having a hollow portion, said arbor member also having a slot leading into the hollow portion, said arbor having a flattened portion substantially opposite the slot to present spaced contact points, a wedge member positioned in the slot and projecting through same, a wedge block within the hollow arbor cooperating with said wedge, screw thread means connected to the block and operable to shift the same axially for shifting the wedge radially in the slot, said arbor member being adapted to receive a bearing at one end of the connecting rod, the outer edge of said wedge and the said two spaced points on the arbor being adapted to engage the inside of the bearing at spaced points, and the said wedge being adjustable whereby the arbor may receive and hold bearings of different diameters, adustable abutment means for positioning the bearing on the arbor axially, the said gauging surface on the body being disposed so as to gauge the free end of the connecting rod when said connecting rod extends from the arbor along the body of the gauging device.

In testimony whereof we affix our signatures.

ALVIN L. MILLER.
RUSSELL H. MILLER.